United States Patent [19]

Møller

[11] Patent Number: 5,620,605
[45] Date of Patent: Apr. 15, 1997

[54] CASSETTE MEMBRANE SYSTEM AND METHOD OF USE FOR LOW PRESSURE SEPARATIONS

[75] Inventor: Jens K. Møller, Maribo, Denmark

[73] Assignee: The Dow Chemical Company, Midland, Mich.

[21] Appl. No.: 341,548

[22] PCT Filed: May 21, 1993

[86] PCT No.: PCT/EP93/01285

§ 371 Date: Nov. 21, 1994

§ 102(e) Date: Nov. 21, 1994

[87] PCT Pub. No.: WO93/24210

PCT Pub. Date: Dec. 9, 1993

[30] Foreign Application Priority Data

May 22, 1992 [GB] United Kingdom ............... 9210980

[51] Int. Cl.$^6$ .......................... B01D 61/00; B01D 63/00
[52] U.S. Cl. ............ 210/650; 210/321.75; 210/321.84; 210/346; 210/484; 210/232; 210/456; 210/433.1
[58] Field of Search ................. 210/321.75, 321.84, 210/484, 321.61, 321.64, 346, 433.1, 416.1, 456, 258, 227, 231, 650, 232; 264/45.1

[56] References Cited

U.S. PATENT DOCUMENTS

| | | | |
|---|---|---|---|
| 3,591,493 | 7/1971 | Zeineh | 210/651 |
| 4,159,250 | 6/1979 | Schnell | 210/321.75 |
| 4,176,069 | 11/1979 | Metz et al. | 210/321.75 |
| 4,430,218 | 2/1984 | Perl et al. | 210/346 |
| 4,749,476 | 6/1988 | Storkebaum et al. | 210/97 |
| 5,035,799 | 7/1991 | Rosberg et al. | 210/416.1 |
| 5,084,220 | 1/1992 | Moller | 264/45.1 |
| 5,192,434 | 3/1993 | Moller | 210/227 |
| 5,192,456 | 3/1993 | Ishida | 210/256 |
| 5,217,612 | 6/1993 | Ondrick | 210/321.84 |
| 5,275,725 | 1/1994 | Ishii et al. | 210/321.75 |

FOREIGN PATENT DOCUMENTS

| | | |
|---|---|---|
| 0229872 | 7/1987 | European Pat. Off. . |
| 0322604 | 7/1987 | European Pat. Off. . |
| 0335648 | 10/1989 | European Pat. Off. . |
| 2609645 | 1/1987 | France . |
| 4007023 | 1/1992 | Japan . |
| 4110090 | 4/1992 | Japan . |
| 4187222 | 7/1992 | Japan . |

*Primary Examiner*—Ana Fortuna

[57] ABSTRACT

A membrane fluid separation apparatus having a vessel, a plurality of membrane cassettes in the vessel, the cassettes including a plurality of membrane units capable of performing a fluid separation at a relatively low transmembrane pressure, arranged substantially parallel to one another with the ends of the membrane units bound in a cure binder such that the interior of the membranes are open at one or both of the bound ends, a casing comprising a frame arranged about one or more of the plurality of membrane units, such that there are two fluid flow systems which do not communicate, the first fluid flow system is in contact with the outside of the membrane units and is adapted for contacting the feed fluid with the membrane units, and the second fluid flow system is in contact with the interior of the interior of the membrane units and with a permeate chamber, the apparatus also includes means for introducing and removing the fluids, vacuum creating means, and means for removing fluid not permeating through the membrane units.

11 Claims, 13 Drawing Sheets

CASSETTE MEMBRANE SYSTEM AND METHOD OF USE FOR LOW PRESSURE SEPARATIONS

FIELD OF THE INVENTION

The invention relates to a system and apparatus for use in the system which contains membrane cassettes and which is useful for separations in which the transmembrane pressure may be low.

BACKGROUND OF THE INVENTION

Membrane separation processes are becoming increasingly popular for the separation of a feed stream into two streams, the retentate stream which is rich in a component which does not selectively pass through the membrane and a permeate stream which is rich in components which selectively pass through the membrane. Examples of such processes include gas separations, such as the separation of oxygen from nitrogen, reverse osmosis processes in which dissolved salts are removed from water, processes for converting surface water to potable water by removing particulates and high molecular weight species such as bacteria, and pervaporation processes in which volatile components of a liquid stream selectively permeate through a membrane.

In order for a membrane separation to be effective there must be some driving force. The two most common driving forces are based on a concentration or a pressure differential from one side of the membrane to the other. When pressure is a driving force the pressure is higher on the feed side of the membrane. When concentration is the driving force, the concentration of the species which preferentially permeates is typically higher on the feed side.

Recently, some plate and frame membrane separation devices have been disclosed (Japan Kokai 41-10090 (application no. 2,229,631) published 10 Apr. 1992; Japan Kokai 47023 (application no. 2,107,991) published 10 Jan. 1993 and Japan Kokai 4187222 (application no. 2,319,141) published 3 Jul. 1992) which have suction pumps on the permeate side of a plate and frame membrane. The pressure differential can be created by the suction pumps. In such devices each membrane element is a plate with a membrane attached to it wherein each plate has a permeate flow channel on the permeate side of the membrane. The suction pump is connected individually to each plate. The membrane plates are carefully separated from one another to allow turbulent flow along the surface of each membrane to facilitate removal of solids which tend to stick to the retentate side of the membrane. The plates are generally placed vertically in a tank. The turbulent flow is created by pumps, blades or air blown through aeration pipes placed near the membrane services.

U.S. Pat. No. 5,084,220 discloses apparatus including membrane cassette which is useful in converting large amounts of surface water into potable water. The disclosed apparatus comprises an array of cassette frames separated by intermediate plates. The cassette frames and intermediate plates are provided with high pressure seals so that when the cassette frames and intermediate plates fit together a pressure tight seal is formed. The whole array of cassette frames and intermediate plates form a pressure vessel when end plates which also seal with the end cassette frames are used. The array of cassette frames intermediate plates and end plates is adapted to be clamped together in its longitudinal direction and loosened, as required, to remove any selected cassette frame. Each cassette frame contains a filtration unit comprising a stack of membranes, in which a first flow passage system is provided which connects two free zones within the cassette frame, said free zones being so connected as to establish a series, parallel or combined series and parallel pattern of fluid flow from the feed inlet to a concentrate outlet. In each stack of membranes is a second system of flow passages which is isolated from the first system and serves to conduct the stream that permeates through the membranes to at least one outlet from each filtration unit. This system is designed to operate at relatively high pressures. The system has been carefully designed to allow the end plates cassette units and intermediate plates to fit together in a fashion such that a pressure case is formed about the membranes. The system also is designed to include relatively sophisticated pressure control and flow control means, and the materials used for the system have been carefully chosen to withstand such high pressures. The use of such costly materials and sophisticated process controls results in a system which may not be cost effective for low pressure applications. It is desirable to develop a system which is capable of performing low transmembrane pressure separations which does not require such sophisticated materials and process controls.

Membrane separation systems are relatively compact when compared to other known separation systems. Yet, many known membrane systems still occupy a considerable amount of space which is not directly used for performing the separation. Pressurized systems typically require external pumps, large pressure vessels, feed, permeate, concentrate and recirculation conduits and external controls, which occupy space not directly used for the separation. A system which more efficiently uses space is desirable.

A common design for membrane apparatus useful for separating liquids is the spiral wound device, which comprises a plurality of pairs of flat sheets with a spacer between the pairs wherein the pairs are sealed. These flat sheets are then rolled up into a jelly roll configuration and placed in a pressure case. An advantage of the spiral wound device is that it allows a large membrane area to be placed in a membrane module. A significant problem of such a device is that the flux is unevenly distributed over the membrane surface. One reason for this is that the pressure drop from one end of the membrane to the other end of the membrane is significant. In order to compensate for the pressure drop problem, most spiral wound membranes are operated with a large feedside pressure. A significant problem created by the use of high feedside pressures and transmembrane pressure differentials is fouling of the membrane, which results from materials which do not pass through the membrane forming a layer on the feedside of the membrane and restricting the access of the feed stream to the feedside of the membrane.

What is needed is a membrane separation system and apparatus which is relatively compact in that the space taken up by portions of the apparatus or system not directly used for separation is minimized. What is further needed is a system which provides for relatively even distribution of the feed along the entire membrane surface and which can perform the desired separation at relatively low feed pressures and transmembrane pressure differentials. Such system would thereby reduce the inherent fouling of conventional membrane separation systems. What is also needed is a system for membrane separations which does not require costly pressure vessels and controls necessary to operate in higher pressure environments.

Those systems which operate at relatively high feed pressures and transmembrane differentials also require high energy consumption in order to achieve the desired separation. What is desired is a system which can operate at low pressures thereby resulting in a considerable energy savings to perform the separation.

SUMMARY OF THE INVENTION

In one embodiment of the invention, there is provided a membrane fluid separation apparatus comprising A. at least one cassette comprising a plurality of membranes and a support for supporting the membranes at their peripheral edges, the said membranes being provided in the form of a plurality of membrane layers, each layer being sealed at at least two of its peripheral edges to one or more adjacent membrane layer, such that the membranes define a feed side and a permeate side, wherein the permeate side of each of the said membranes opens into at least one collection area, and wherein the membranes are sealed such that the feed side and permeate side of the membranes do not communicate otherwise than through the membranes;

B. means for contacting the feed fluid with the feed side of the membranes;

C. means for removing the permeate from the permeate collection chamber;

D. means for creating a transmembrane pressure differential by reducing the pressure on the permeate side of the membranes to subatmospheric pressure.

In a further embodiment of the invention there is provided a membrane fluid separation apparatus comprising A. a plurality of membrane cassettes which comprise i. one or more filtration units comprising a plurality of membrane units which comprise membrane structures capable of performing a fluid separation at a relatively low transmembrane pressure, wherein the membrane structure has an internal surface and an external surface which do not communicate, the internal surfaces of the plurality of membrane units are open in one or more common areas to facilitate flow of permeate out of the membrane units, such common open areas are sealed such that fluid flowing from the vicinity of internal surfaces of the membrane units can not communicate with the external surfaces of the membrane units;

ii. a casing comprising a frame arranged about the one or more filtration units such that there are two fluid flow systems which do not communicate, the first fluid flow system is in contact with the external surfaces of the membrane units and is adapted for contacting feed fluid with the membrane units and the second fluid flow system is in contact with the internal surfaces of the membrane units and the casing further comprises a permeate collection chamber in contact with the internal surfaces of the membrane units in the vicinity of the common open areas and a flow passage which is adapted for removing permeate from the vicinity of the internal surfaces of the membrane units;

B. a means for contacting the feed fluid with the external surfaces of the membrane units;

C. a means for removing the permeate from the permeate flow passages of the plurality of membrane cassettes;

D. one or more means for creating a transmembrane pressure differential by reducing the pressure on the internal surfaces of the membrane units to subatmospheric; and E. a means of removing feed fluid which does not permeate across the membrane from the vicinity of the external surfaces of the membrane.

Another embodiment the invention is a method of separating a feed fluid stream into two components which comprises A. contacting the feed stream with the external surfaces of the membrane units of apparatus as defined above, B. reducing the pressure on the permeate side of the membranes, preferably to from 0.1 to 0.8 bar (10,000 to 80,000 Pa), such that a portion of the feed fluid permeates through the membrane;

C. removing the portion of the feed fluid which permeates through the membrane from the vicinity of the internal surfaces of the membrane; and D. removing the portion of the feed fluid which does not permeate through the membranes from the vicinity of the external surfaces of the membrane.

The apparatus of the invention is designed to function at relatively low feed transmembrane pressures, and costly pressure vessels and process control equipment necessary to operate at high feed pressures are not required. The apparatus operates at significantly lower feed pressures and transmembrane pressure differentials than conventional systems and methods, said feed pressures and transmembrane differentials being lower than previously believed possible. The membrane apparatus of the invention is relatively compact and does not require a significant amount of space beyond that necessary to perform the separation. The system, apparatus and method of use are generally more cost effective than conventional membrane systems.

DESCRIPTION OF THE PREFERRED EMBODIMENTS

Figure 1:
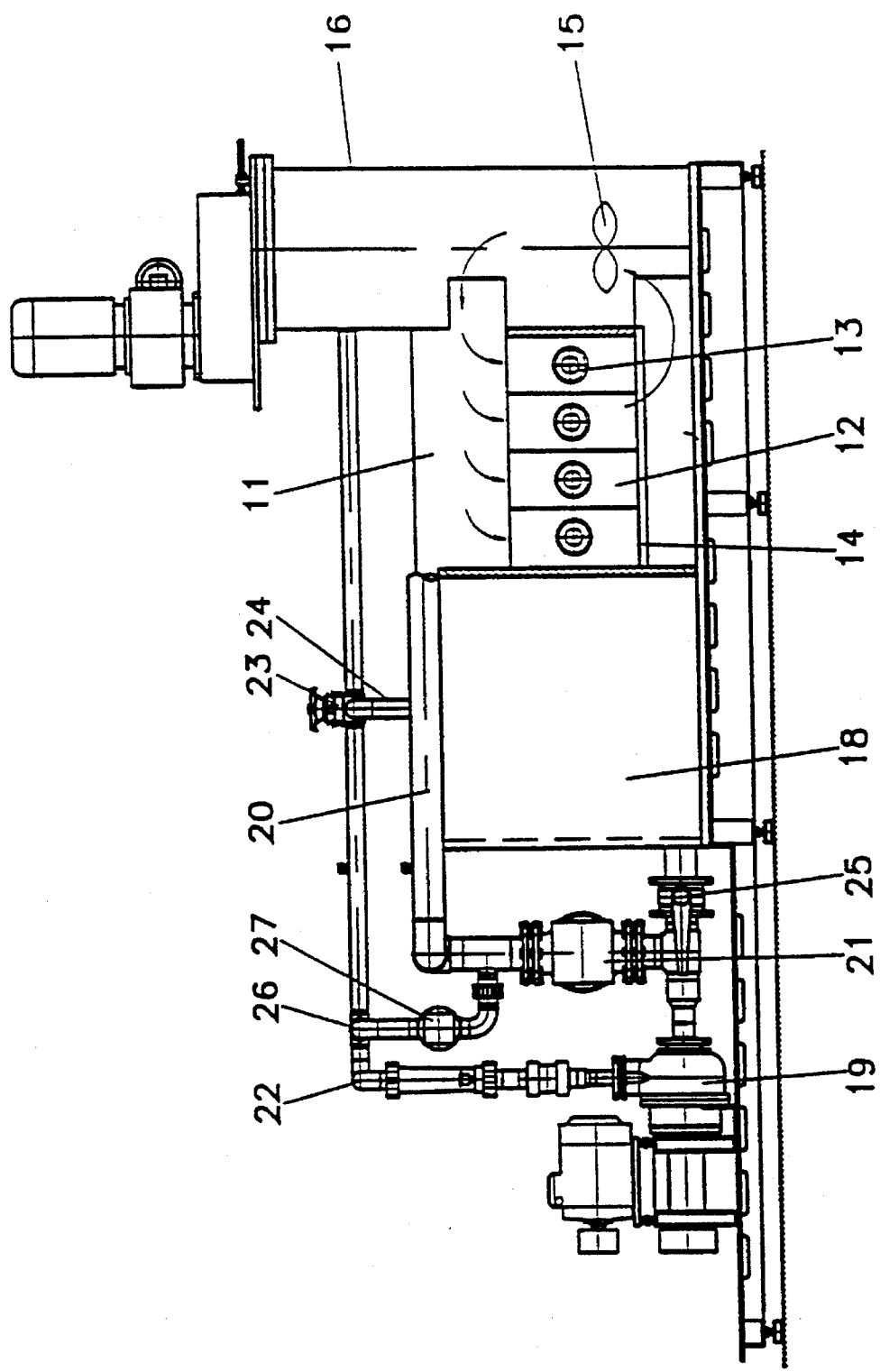
FIG. 1 is a general side view of a free standing system according to this invention.
Figure 2:
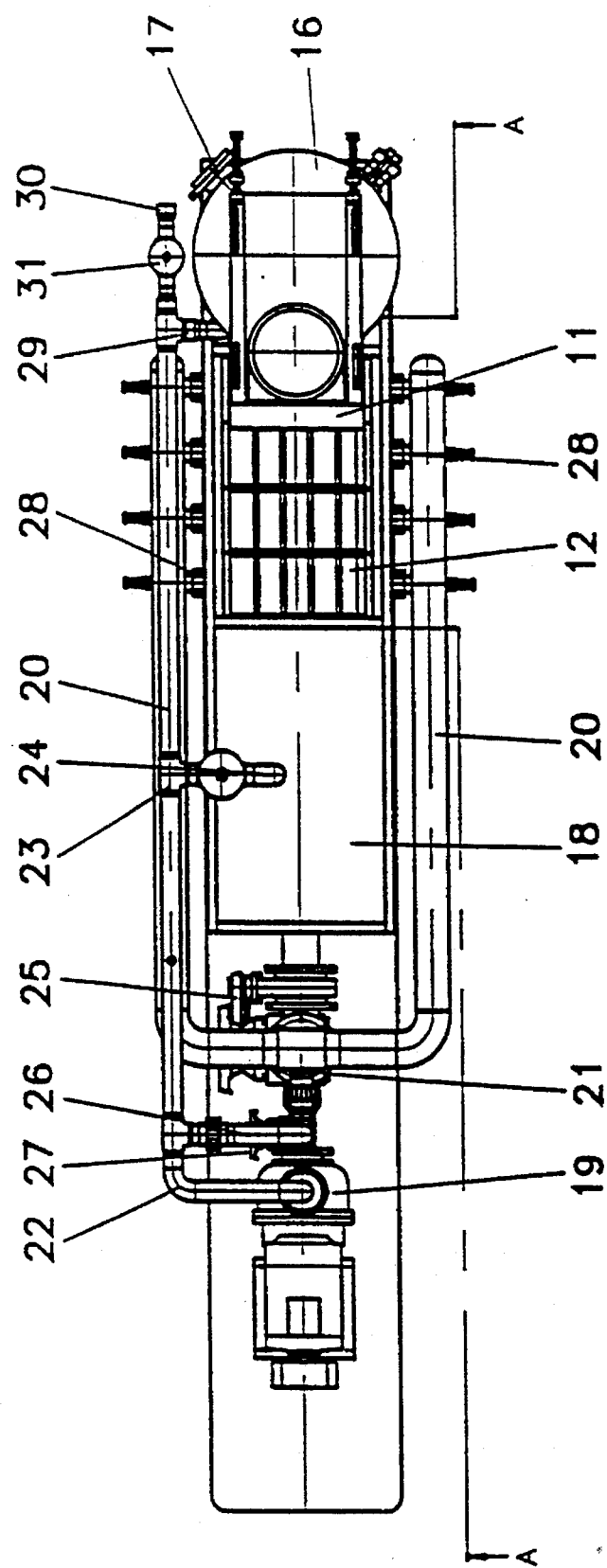
FIG. 2 is a general vertical view of a free standing system according to this invention depicted in FIG. 1.
Figure 3:
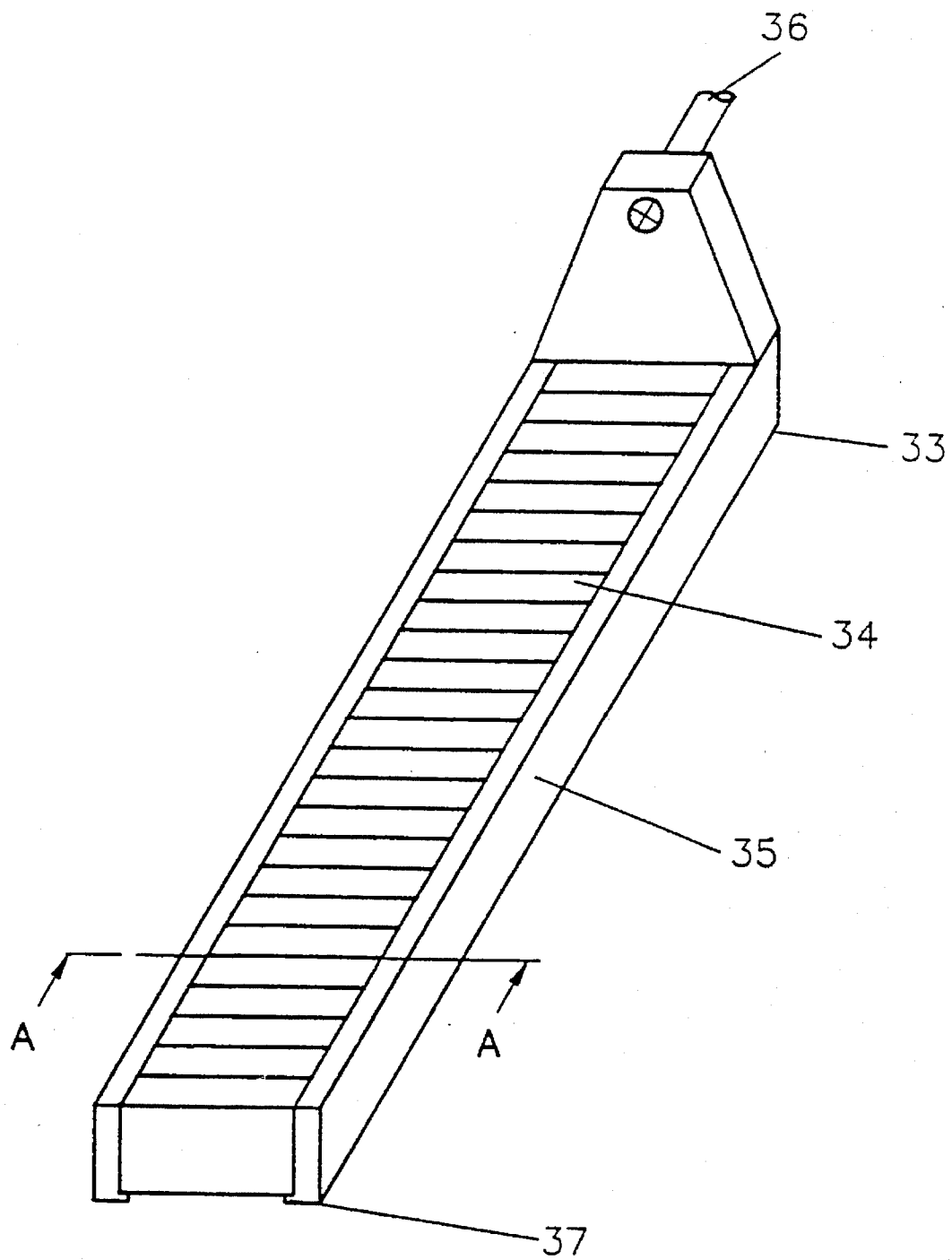
FIG. 3 is a perspective view of a subassembly of the claimed invention, specifically a rack adapted for holding 25 double membrane cassettes.
Figures 4, 13:
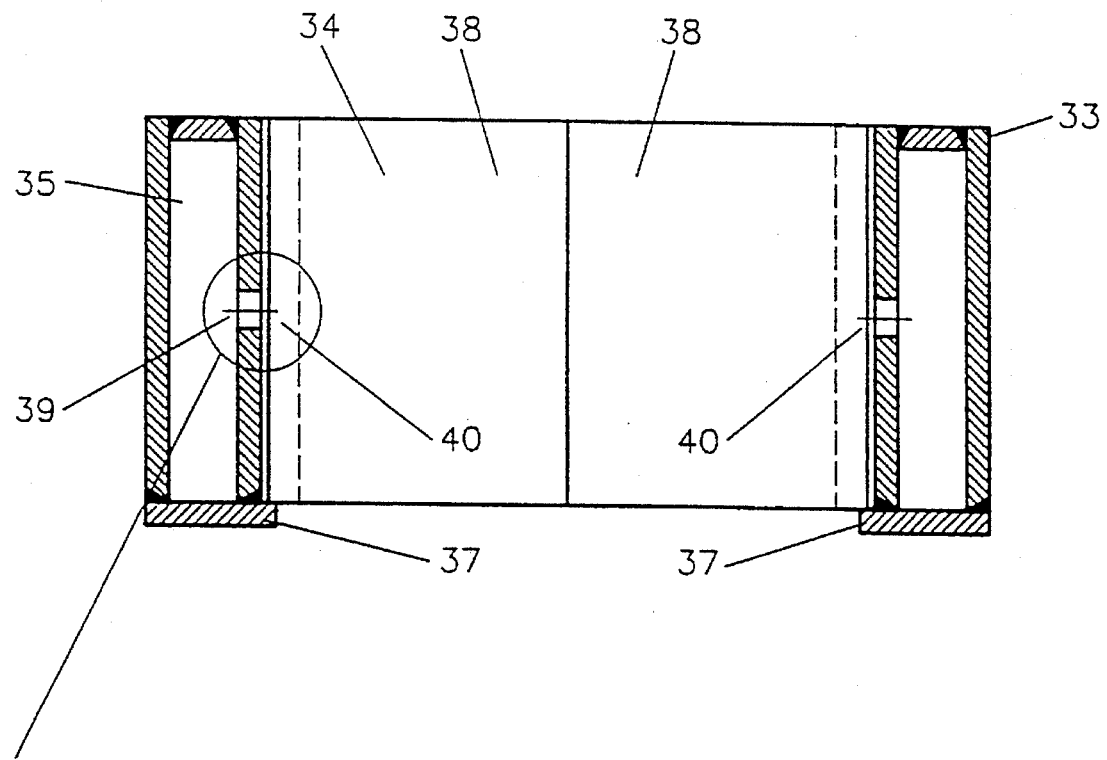
FIG. 4 is a cut away cross-section of the end of the rack depicted in FIG. 3.
FIG. 13 shows an expanded view of the connection of the permeate collection chamber of the membrane cassette to the permeate manifold of a support rack of FIG. 4.
Figure 5:
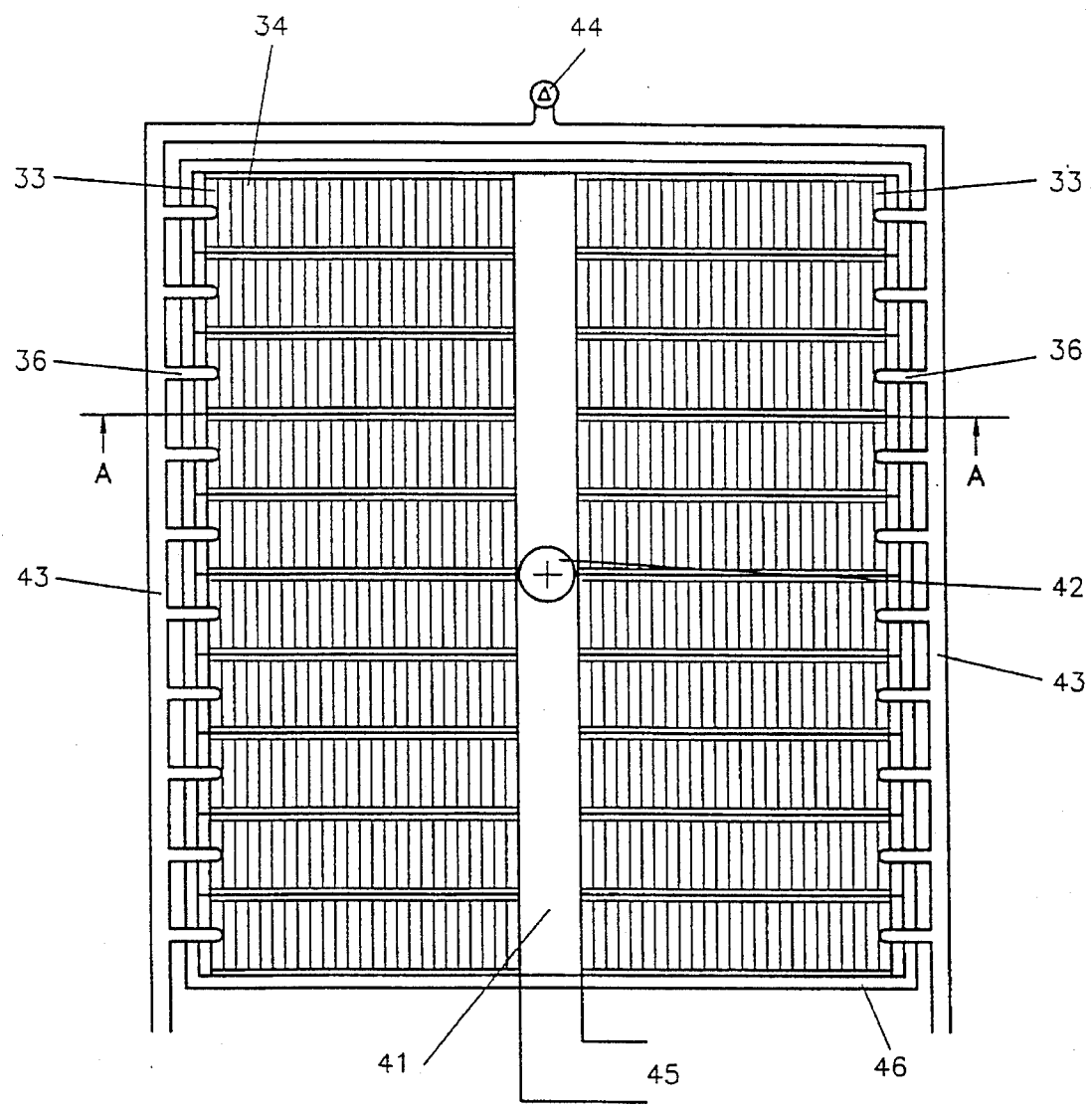
FIG. 5 is the top view of an open channel rack membrane cassette system.
Figure 6:
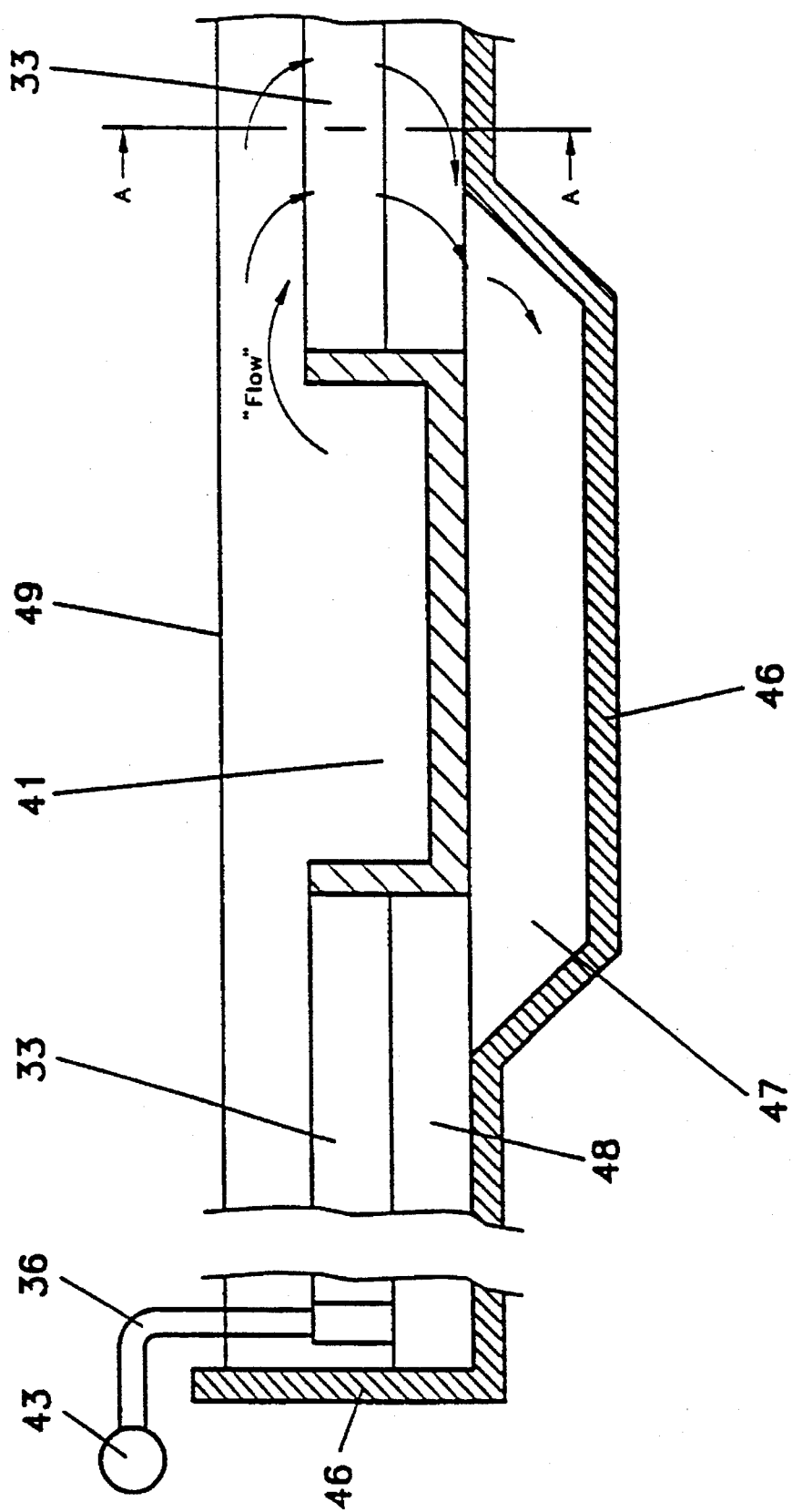
FIG. 6 is a side cut away view of the open channel separation system depicted in FIG. 5.
Figure 7:
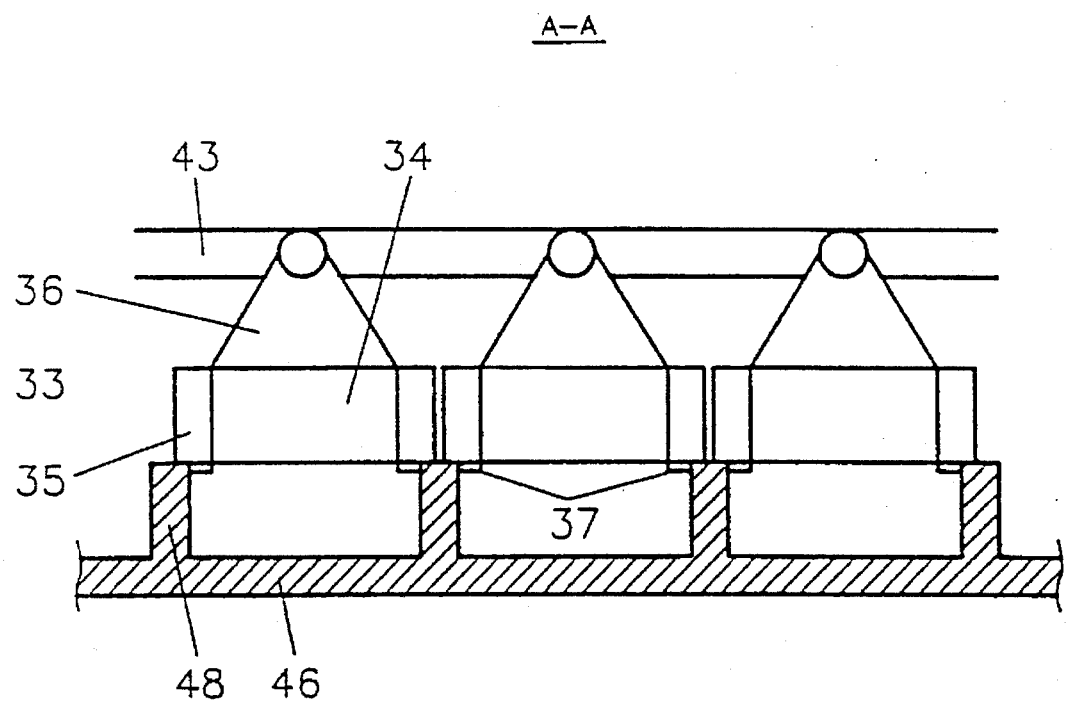
FIG. 7 demonstrates a partial cut away from the side of the channel separation system depicted in FIGS. 5 and 6.
Figure 8:
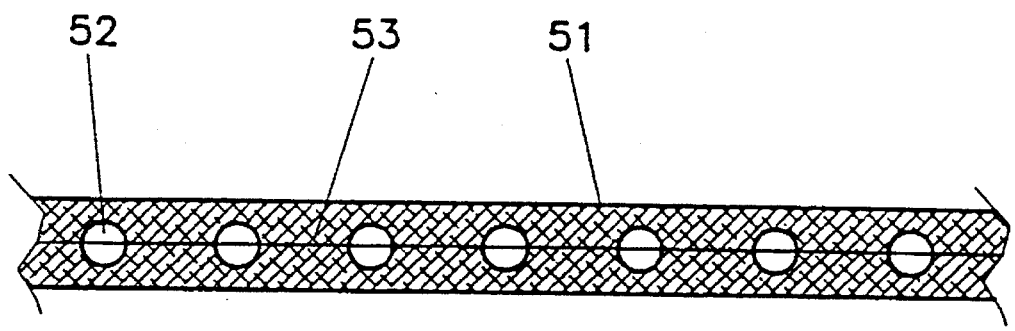
FIG. 8 demonstrates a stage in the assembly of a hollow fiber membrane cassette, specifically the end view of a single layer of hollow fires potted in a curable binder.
Figure 9:
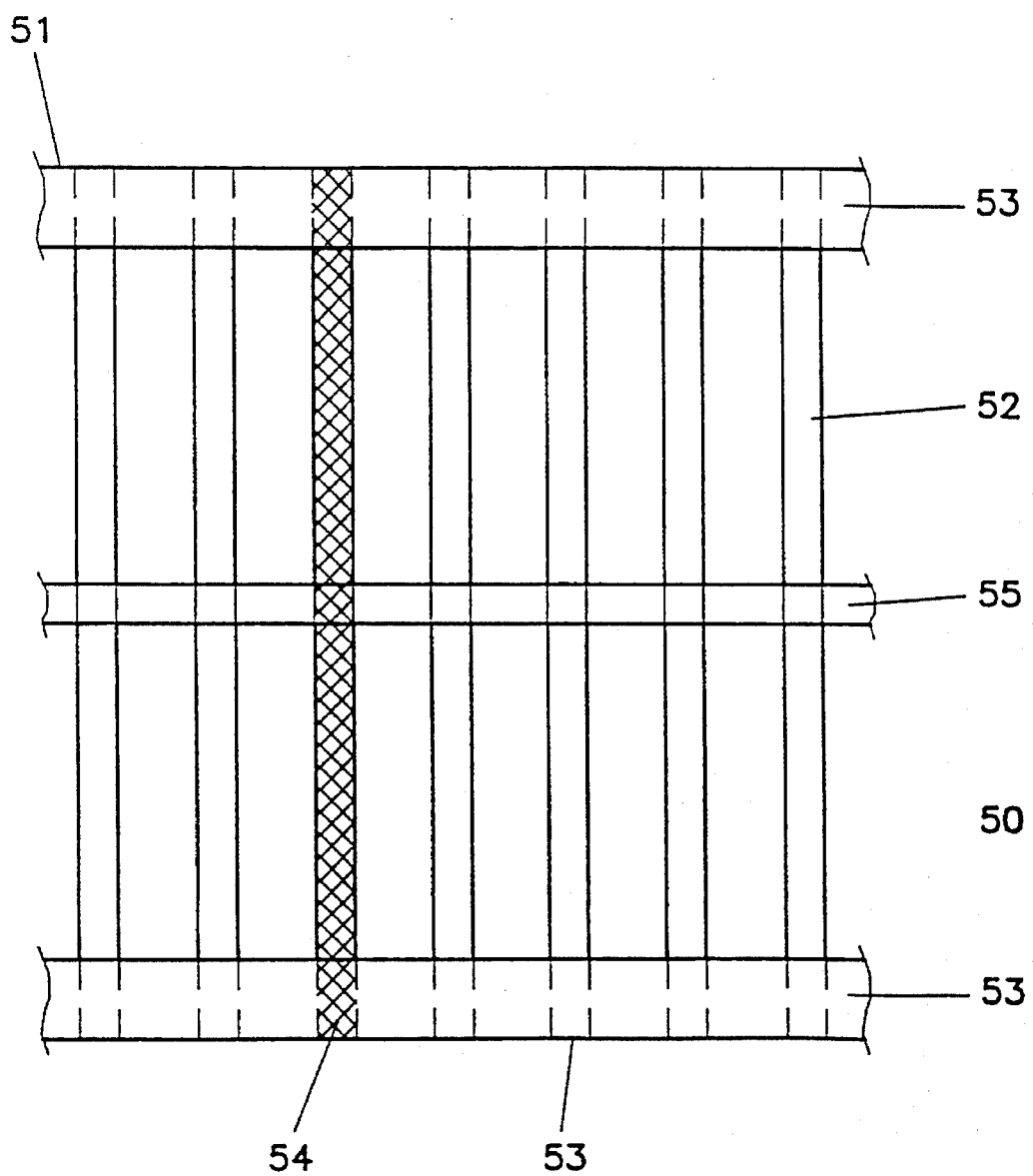
FIG. 9 demonstrates a stage in the assembly of a hollow fiber membrane cassette and specifically shows the top view of the same layer as depicted in FIG. 8.
Figure 10:
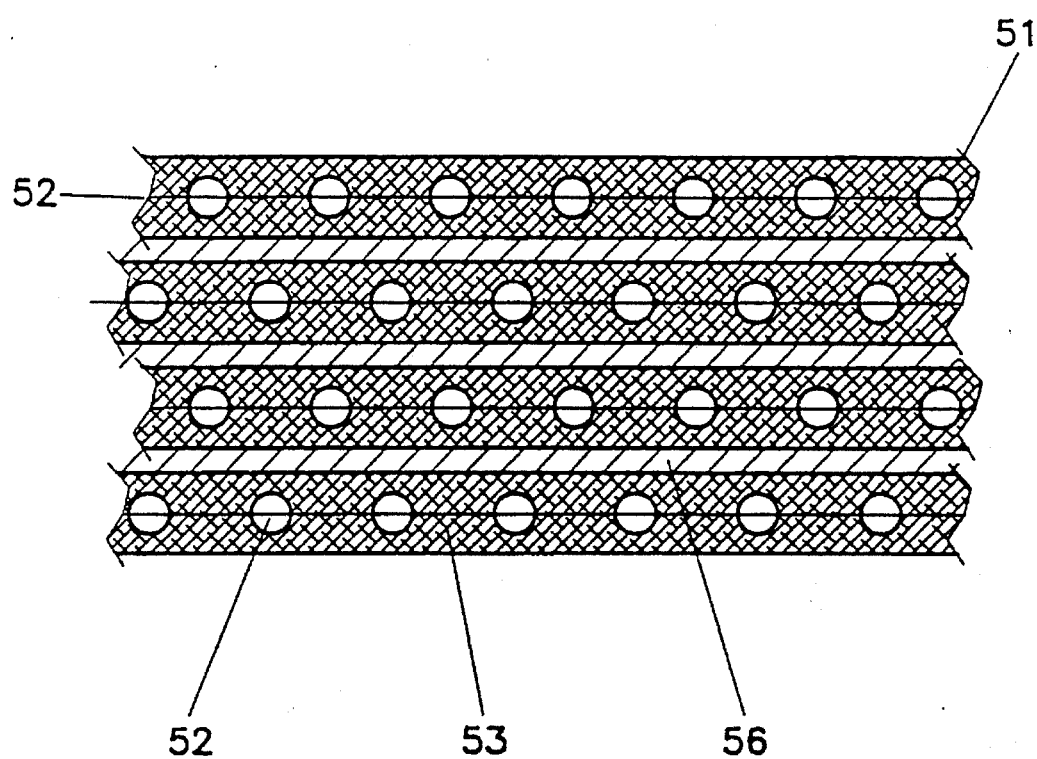
FIG. 10 demonstrates a stage in the assembly of a hollow fiber membrane cassette, specifically a series of hollow fiber layers built up into a stack.
Figure 11:
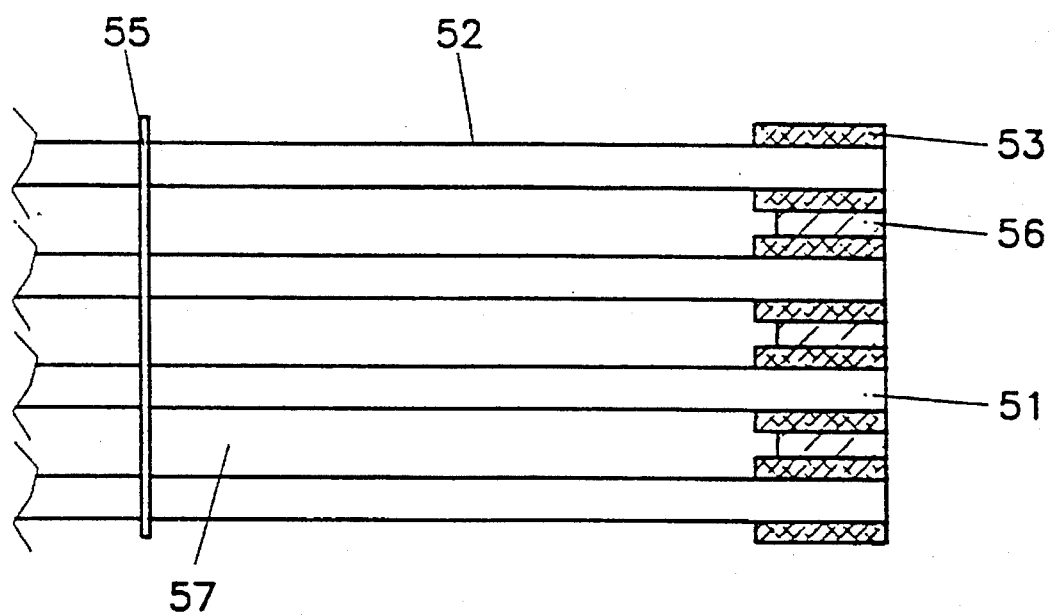
FIG. 11 demonstrates a stage in the assembly of a hollow fiber membrane cassette and specifically shows a side view of the same assembly depicted in FIG. 10.
Figure 12:
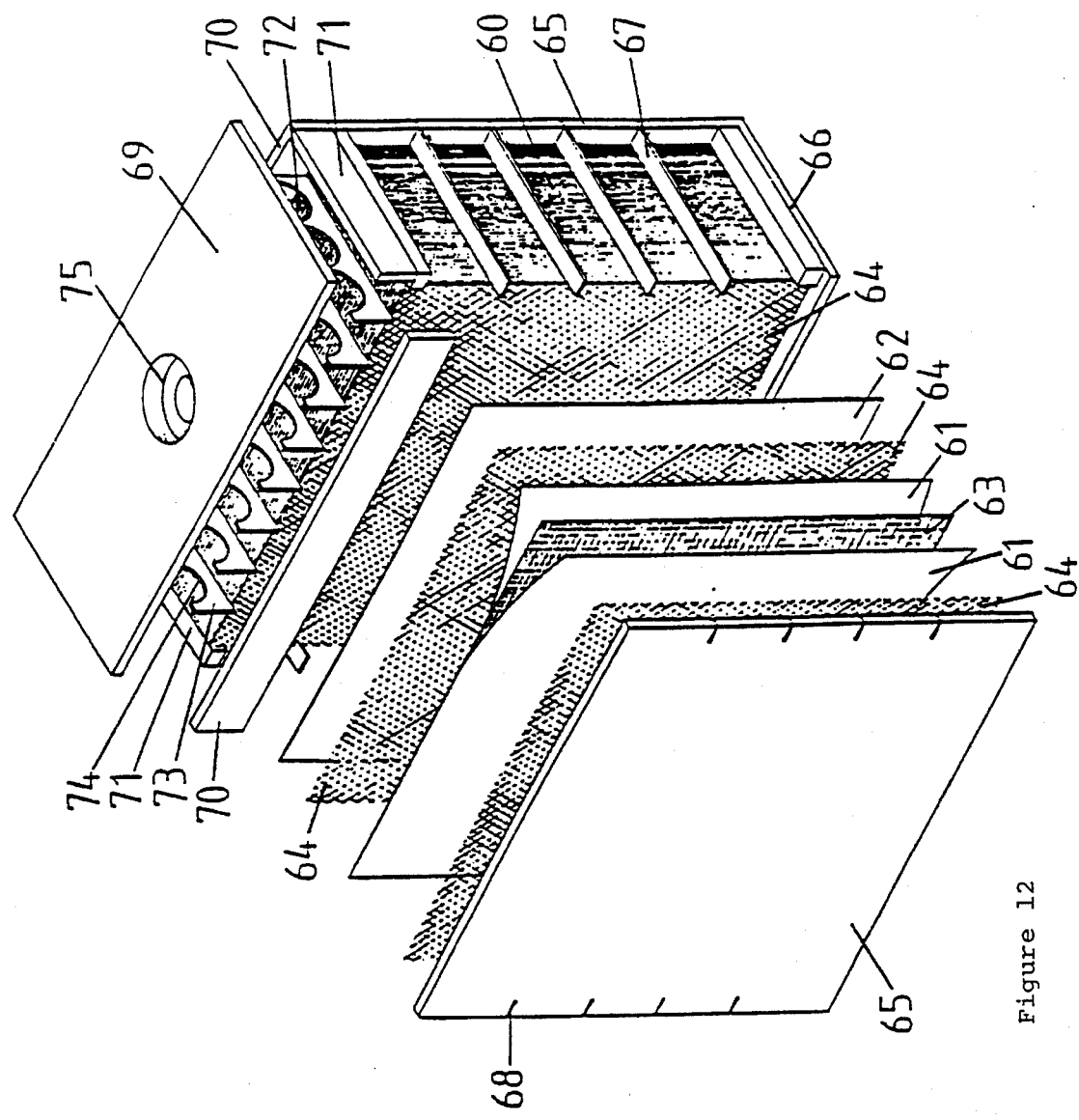
FIG. 12 demonstrates a preferred assembly of the membrane cassette.
Figure 13:
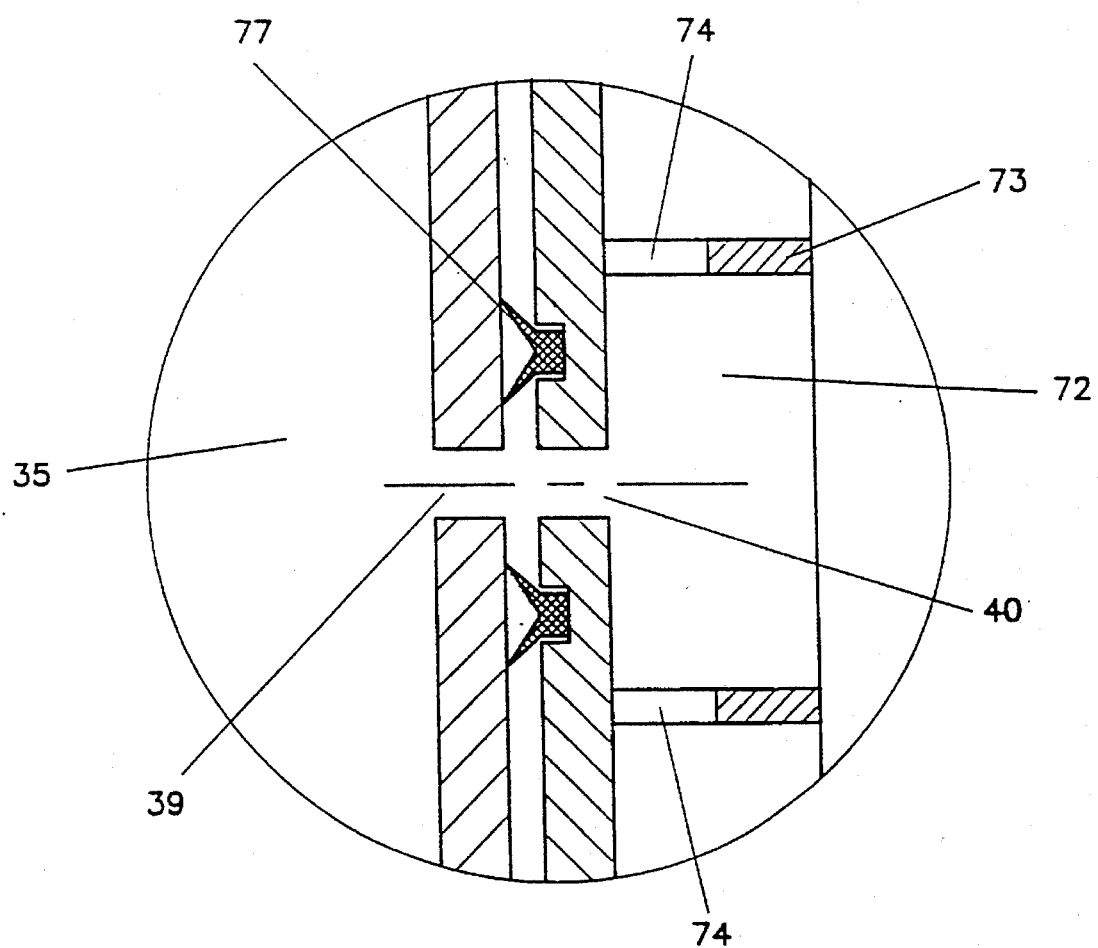

FIGS. 1 and 2 demonstrate two views of a free standing system according to the invention. FIGS. 3 and 4 show a subassembly of the claimed invention specifically a rack adapted for holding 25 double membrane cassettes. FIGS. 5, 6 and 7 illustrate three different views of a large open separation system of the invention. FIG. 8 demonstrates an end view of a layer of hollow fibers for use in a membrane cassette. FIG. 9 shows a top view of the same layer as illustrated in FIG. 8. FIG. 10 illustrates an end view of a stack of the layers illustrated in FIGS. 8 and 9. FIG. 11 illustrates a side view of the assembly shown in FIG. 10. FIG. 12 demonstrates a preferred assembly of a membrane cassette. FIG. 13 shows an expanded view of the connection of the permeate collection chamber of the membrane cassette to the permeate manifold of a support rack of FIG. 4.

The membrane cassettes shown in FIGS. 3 and 4 comprise a support, generally in the form of a casing containing a plurality of membranes arranged into filtration units which are capable of performing the desired separation. Plurality as used herein means more than one. Generally several of the described units are employed, although the number of units can be chosen to fit the particular use and needs. The terms "internal surface" and "external surface" as used herein are intended to mean the permeate side and feed side of the membrane respectively.

The filtration units shown comprise a plurality of parallel membrane units. The filtration units comprise a plurality of membranes sealed in a manner such that internal membrane surfaces do not communicate with the external membrane surfaces so as to form a zone for flow of permeate from the vicinity of the internal surfaces of the membrane units which zone does not communicate with the external surfaces of the membrane units which are in contact with the feed flow system. Membrane units mean herein a membrane structure having an internal surface and external surface which do not communicate with each other. Any form of membrane may be used. Examples include hollow fibers, hollow tubes, and pairs of flat membranes sealed along their edges. The membrane units may be made of polymeric, ceramic, or metallic materials and may be in a homogeneous, asymmetric, or thin film configuration. Those membranes which are useful in this invention are those which are capable of performing a separation at relatively low feed pressures and transmembrane pressure differentials. Relatively low transmembrane pressure differential as used herein generally means a pressure differential of less than $2 \times 10^5$ Nm$^2$ (i.e., generally a transmembrane pressure differential created by applying a vacuum to the permeate side of a membrane and optionally in addition applying pressure to the feed side of the membrane of not more than $10^5$ Pa (equivalent to about 10 m W.C. (meters in a water column) more preferably not more than $3 \times 10^4$ Pa (about 3 m W.C.). In a preferred embodiment the transmembrane pressure is created by applying a vacuum to the permeate side of the membrane only. The fluids which may be separated by the membranes useful in this invention are gases, vapors or liquids which are capable of separation at low transmembrane pressure differentials. For example, this invention may be used for gas separations, the separation of volatile vapors from liquids (pervaporation), the separation of high molecular weight or large particle size materials from a liquid. Preferably the membranes of this invention are used for separating high molecular weight materials or large particle size materials from a liquid, for instance the removal of particulate solids and high molecular weight materials from water to prepare potable water. The preferred membranes are membranes useful in ultrafiltration and microfiltration processes. Such membranes generally have a molecular weight cutoff of 10,000 or greater, more preferably 20,000 and most preferably 50,000 or greater. Generally such membranes are capable of removing materials having a particle size of five microns or less, preferably two microns or less from a liquid stream, more preferably such membranes have a molecular weight cutoff of 100,000 or less.

In the embodiments shown, the membrane units are arranged in an ordered fashion, preferably parallel to one another. The internal surfaces of the plurality of membrane units are open in one or more common areas to facilitate flow of permeate out of the membrane units. The common open areas are sealed from the first fluid flow system. The common open areas allow permeate fluid to flow from the vicinity of the internal surfaces of the membrane units and thus are part of the second flow system, permeate flow system. The common area can be along the edge of a stack of flat sheet membrane pairs or may be at the end of a bundle of hollow fibers or tubes. In one embodiment two ends or edges of the ordered membrane units are sealed by being bound in a cured binder. Useful binders are those which hold the arranged membrane units together and form a fluid impermeable seal when cured. Curable binders which may be used include materials which are flowable prior to curing but form a relatively rigid solid polymer subsequent to cure, and include epoxy resins and polyurethanes. The permeate side of the membrane units are opened on at least one bound end of the filtration unit. Both ends or edges of the membrane units of the filtration unit can be open. Whether one or both ends or edge of the membrane unit are open depends upon the desired separation and design of the membrane separation system. Where high flux is desired it is desirable to have both ends or edges of the membrane units open. Where low flux is desired it is desirable to have only one end or edge of the membrane units open. The cured binder about the bound end or edge of the membrane units form a seal with the cassette frame to seal the open internal surface of the membranes from the external surfaces of the membranes units. The sealed ends of the membranes units which are open communicate with the permeate collection chamber of the frame so as to allow removal of fluids permeating through the the membrane from the vicinity membrane units. Each permeate collection chamber has a permeate outlet adapted for the removal of permeate from the membrane cassette unit.

The membrane support may be a casing or frame arranged about the plurality of membrane units such that there are two fluid flow systems which do not communicate. The first fluid flow system is in contact with the external surfaces or feed side of the membrane units and is adapted for contacting a feed fluid with the membrane units. The second fluid flow system is adapted for removal of permeate from the internal surfaces or permeate side of the membrane units. The casing may be adapted to create a permeation collection chamber. This permeation collection chamber is in contact with the permeate side of the membrane units and is adapted to receive the fluid which permeates through the membranes into the interior of the membranes. The permeation collection chamber also has an outlet for removing permeate from the cassette unit.

The support allows access of feed fluid to the feed side of the membrane unit. Additionally, the support, in conjunction with the curable binder at one or both ends of the membranes functions to seal the feed flow system from the permeate flow system. In one preferred embodiment, the support is a four sided box or casing arranged about the membranes with at least one permeation collection chamber at one end of the box which is sealed from the remainder of the box. Two sides of the box are open so as to allow access of feed fluid to the feed side of the membrane units. The box can be fabricated from any material which is capable of providing support for the membrane unit, impermeable to the fluids to be contacted with the membranes and does not react with such fluids. Preferably, the casing may be prepared from metal, plastic, fibreglass or a composite.

As described herein the support in arrangement with the membrane units creates two flow systems. The first is a feed flow system which allows the fluids to be separated to be contacted with the feed side of the membrane units. The second flow system is a permeate removal system which is designed to remove those fluids permeating through the membranes from the vicinity of the membrane units.

In one embodiment, a casing can contain two separate filtration units, that is double cassette. Preferably the membranes of the filtration units are open to permeate outlets on opposite ends of the casing and the membrane units have only one outlet from the permeate side of the membranes. In one embodiment, the membranes from each unit can be closed at the end opposite the opening by welding. Alternatively, the membranes can be welded to the adjacent membranes.

In general, the filtration units can be prepared by first arranging the membrane layers parallel to one another. Thereafter one or two ends of the filtration units are sealed, for instance by contacting it with the curable binder and using curable binder, such that the ends of the membrane units are sealed between the end of filtration unit and the feed side of the membrane units. Thereafter, a portion of the sealed area of the membrane units may be carefully cut away from one or both ends of the filtration unit to expose the internal surfaces or permeate side of the membrane units. The preparation of the filtration units as described can be performed prior to contacting them with the casing or can be performed after the membrane units have been arranged in the casing.

In one embodiment a series of flat sheet membranes are used to prepare the cassette unit. In such embodiment the flat sheet membranes may be rectangular (for example square) and arranged in pairs. The size of the flat sheets can be any size suitable for the desired end use. A significant advantage of this system is that the membranes can have a large area. The choice of size is dependent upon the desired flux, flow rates and transmembrane pressure differential. Preferably the flat sheet membranes have a width of 100 mm or more, more preferably 200 mm or more and most preferably 400 mm or more. Preferably such membrane sheets have a width of 2000 mm or less, more preferably 1000 mm or less, and most preferably 500 mm or less. Such membrane sheets preferably have a length of 100 mm or more, more preferably 200 mm or more and most preferably 400 mm or more. Preferably such membrane sheets have a length of 2000 mm or less, most preferably 1000 mm or less and most preferably 500 mm or less. In one preferred embodiment, a spacer is placed between each membrane of the membrane pair. Such spacers are well known in the art and the choice of spacer is dependent on the separation for which the system will be used. The membrane spacer is used to facilitate the flow of permeate in the membrane unit and removal of permeate from the membrane unit. In another embodiment, it is desirable to place a spacer between adjacent pairs of membrane sheets so as to facilitate the flow of feed fluid to the membranes. Spacers which may be used are well known in the art and the selection is dependent upon the separation to be performed. U.S. Pat. No. 5,084,220 provides a description of preferred spacer units.

The flat sheet membrane units of the invention may be prepared by processes described in U.S. Pat. No. 5,084,220.

In particular, envelope shaped membrane units are preferably produced by placing a membrane sheet, of a square or rectangular shape, on top of another one and uniting the sheets along all four edges by welding or gluing. A spacer unit or element may be sandwiched between the membrane layers as previously described, before welding or gluing. Optionally the surface of the areas which later come into contact with the curable binder if required may be treated to improve the adhesion of the binder to the membrane units. A stack of membrane units, and optionally external spacing elements, is built up and a curable binder is introduced into the interspaces between the membrane units of one end or two opposite ends of the stack. After the binder has been cured the marginal portions of the membrane units and any spacing elements provided there between, as well as the binder are removed from the surface or surfaces where the binder was previously introduced into the interspaces or openings between the membrane units. The removal of material is complete when the desired openings have been formed along the edges of the membrane units to facilitate permeate removal and so that the remaining portions of the joint formed by the binder are not affected and will function as a seal. Thereafter the casing can be built up around the filtration unit. The casing can be welded by appropriate means to the binder to form the appropriate seal and the permeation collection chamber. In another embodiment the stack of membranes can be built up in a preformed box and thereafter contacted with curable binder. After the binder and membranes are cut away from one or two ends of the stack, the frame is then completed.

In another embodiment, the membranes may be in the form of hollow fibres or hollow tubes. In this embodiment, a thin layer of hollow fibres or hollow tubes are laid parallel to one another in a moulding box. Thereafter a small amount of curable binder is introduced at either end of the hollow fibres so as to bind the hollow fibres together. Optionally, one or more supporting strips of binder may be placed between the end strips of binder to support the middle of the hollow fibres. Thereafter a plurality of these layers of hollow fibres which have been bound together are placed in a moulding box stacked to the desired height and additional curable binder is added at the ends of the hollow fibres to bind the hollow fibre layers together. One or both ends of the stacks of hollow fibres are then carefully cut open to expose the ends of the hollow fibres leaving enough binder to bind the stack together and to form a seal between the end of the hollow fibres open to the permeate flow system and the outside of the hollow fibres open to the feed flow system. Thereafter the appropriate casing can be built up around the stack of hollow fibres as described hereinbefore.

In that embodiment where flat sheet membranes are used, there is no physical limit on the number of flat sheet membranes in a filtration unit. The critical aspect is the desired flux and flow for the system, which is dependent upon the particular use. In the flat sheet form there are preferably 200 sheets or less and more preferably 100 sheets or less. Preferably there are 50 sheets or greater and more preferably there are 70 sheets or greater.

The apparatus of the invention may also comprises means for creating flow of feed fluid to and along the membrane units. This is adapted to insure that the feed fluid flows along the membrane units thereby improving the efficiency of the membrane units and the separation. This means can be any means which causes the feed fluid to flow along and in contact with the membrane units. This means can be a natural flow as created, by a river or stream, gravity, or can be created using a pump or propeller which causes the fluids to flow in the appropriate manner. In those embodiments where the feed fluid is a liquid from which high molecular weight materials or large particle size materials are to be removed, a propeller which causes the feed fluid to circulate along the membrane is a preferred means. Preferably the feed flow is created such that the feed flows in a direction parallel to the surface of the membrane.

The system or apparatus of the invention further comprises means for removing the permeate from the permeate collection chamber. This can be any means which functions to remove the permeate from the permeate collection means and the system. The means for removing permeate can be a series of conduits attached to the permeation outlets of each cassette and thus the permeate collection chamber of each cassette. Alternatively, the permeation removal means can be a manifold to which the permeation outlets of each cassette is attached. The series of conduits or the manifold is thus connected with some means of removing the permeate from the vicinity of the cassettes. Preferably this means is integrated with all of the permeation collection chambers and permeation outlets from each cassette unit.

The system or apparatus of the invention further comprises means for creating a transmembrane pressure differential by reducing the pressure on the internal surfaces of the membranes or the permeate side to subatmospheric pressures. One such means is a means which subjects the permeate side of the membrane units to a vacuum. Optionally, additional transmembrane pressure differential can be created by applying a relatively low pressure to the feed side of the membranes. Any means known for applying pressure to the feed side of the membrane can be used. In such an embodiment a pressure vessel must be used. In view of the fact that the pressure which may be applied to the feed side of the membrane units is relatively low the requirements for a pressure vessel are not stringent and will not add significant costs to the system. Preferably the feed pressure which may be applied to the feed side of the membrane is $10^5$ Pa (approx 10 m W.C. (water column)) or less, more preferably 30,000 Pa (3 m W.C.) or less. The feed pressure applied to the feed side of the membrane may be 20,000 Pa (0.2 m W.C.) or more, and more preferably 50,000 Pa (0.5 m W.C.) or more. It is preferred to create the transmembrane pressure differential solely by reducing the pressure on the permeate side of the membrane units to subatmospheric. This may be achieved by integrating a means for applying a vacuum with the permeate removal means as part of the permeate flow system. Generally a pump which will run such that a vacuum can be applied to the permeate side of the units can be used. Those skilled in the art will recognize suitable means for reducing the pressure. Preferably the pressure on the permeate side is less than one bar absolute and preferably 0.6 bar absolute or less. Preferably the pressure on the permeate side of the membrane is 0.1 bar (10,000 Pa) or more, and most preferably 0.3 bar (30,000 Pa) or more. Generally the transmembrane pressure is 0.8 bar or less, more preferably 0.6 bar or less. Preferably the transmembrane pressure differential is 0.1 bar (10,000 $Nm^2$) or more and most preferably 0.3 bar (30,000 $Nm^2$) or more. A significant advantage of using a low transmembrane pressure differential is that there is less fouling of the membrane thus allowing the membrane to be used for longer times prior to back-washing.

The choice of transmembrane pressure differential is affected by the nature of the membranes and the materials to be separated. A vacuum pump which may be used to apply vacuum to the permeate side of the membrane can be any of those skilled in the art, and preferably is capable of creating a vacuum of 1.5 m W.C. (i.e., an absolute pressure of 85,000 Pa) or better. The pump may be capable of creating a vacuum of 8.0 m W.C. (20,000 Pa) or less, and in particular 3.0 m W.C. (70,000 Pa) or less. In another embodiment the means for removing permeate can be attached to a well with a pump in the well. Use of a well facilitates the use of a less efficient pump to apply an equivalent vacuum to the permeate side as provided by a more efficient pump without the use of a well. For instance a good pump can create vacuum up to 8 to 9 m W.C. (an absolute pressure of 10,000 to 20,000 Pa), however, it is also possible to use a 10 m deep well and place the pump 3–4 m down the well. In this case a full vacuum (limited by vapor pressure of water) can be created by a pump which creates 6 to 7 m W.C. of vacuum.

The apparatus of the invention may also comprise means for removing concentrate from the vicinity of the cassettes. Concentrate as used herein means the portion of the feed fluid which does not permeate across or through the membrane also commonly referred to as retentate. Any means which removes fluid from the vicinity of the cassettes and thus from the system or apparatus can be used. Generally a port or pipe may be used to remove such concentrate.

The system of the invention may further comprise a means of injecting a gas, such as air, nitrogen or a similar gas into the vicinity of the membrane cassettes. Such means are well known in the art and are present to prevent the build-up of particulate materials on the retentate surface of the membranes. Placing a pipe or hose into the membrane system which either has air jets or perforations are among preferable means of injecting a gas into the system. Preferably, such means are placed in close proximity to the membrane cassettes. Preferably, the gas injection means is placed such that the flow of the gas injected is opposite to the flow of fluid to be separated, and more preferably, parallel to the surface of the membrane. Removal of particulate material is particularly effective when the use of gas injection means with flow opposite to the fluid flow is combined with backflushing.

The apparatus of the invention may additionally comprise a vessel which is adapted to hold the membrane cassettes and to bring them in contact with the feed fluid. The vessel can be any container or enclosure which functions to contain the membrane cassettes and to contact them with the feed fluid. In one embodiment the vessel can be an earthen vessel, such as a hole or slit in the ground, and may be the banks and bottom of a river, lake, stream or pond. In another embodiment, the vessel can be any kind of container which is capable of functioning as described. The container can be comprised of any material which is not adversely affected by the feed materials or which does not adversely affect the feed materials. Among preferable materials are metal, plastic, concrete, fibreglass and composites. In one embodiment, the vessel can be a sealed container which may be a pressure vessel capable of handling relatively low super-ambient pressures. A pressure vessel may be desirable where the fluids to be separated are vapors or gases or where it is desirable to apply a low feed pressure to the feed side of the membrane. Alternatively, the vessel can be open to the environment. The vessel used for the claimed system is preferably a simple container which is not specially adapted for use with pressures higher than atmospheric, as such containers are more cost effective.

The apparatus of the invention may additionally comprise means for the introduction of a feed fluid to the system which is adapted to provide the materials to be separated to the membrane units so as to permit appropriate separation. This means can be any method of bringing the feed fluid into contact with the membrane units. This can be a channel, a pipe or a conduit which is capable of transporting fluids. The means for introducing feed can simply be a port through which the feed material is introduced into the system.

The cassettes can be placed or laid in the vessel with or without support provided each cassette is connected to the permeate removal means. Preferably the cassettes are placed and supported in the vessel by means of a support means. The objective of such a support means is to allow the placement of the cassettes in the best possible location and to optimize feed flow to the membrane units. Such support means can be a rack which can be placed in the vessel or shelves or brackets or the like which are attached directly to the vessel and which are capable of supporting the cassettes in the desired position. The rack which may be used can be free-standing or can be fixed in the vessel. In one preferred embodiment the rack which is used contains at least one sealed manifold which can be placed in communication with the permeate outlets of each cassette and is thus integrated into the permeation removal means.

The apparatus of the invention may further comprise means for back-washing the membrane. In many of the separations for which the system or apparatus of the invention may be useful materials which will not pass through the membranes may restrict the access of additional feed fluid to the membrane units thereby fouling the membrane units. To remove such materials, it is desirable to back-wash the membrane units. Back-washing is performed by forcing liquid from the permeate side through to the feed side so as to remove the materials fouling the membrane units. The means for back-washing the membranes can be any means conventionally used in the art. Preferably some form of pump is used to provide pressure on the permeate side so as to force liquid against and through the permeate side to the feed side. A separate pump can be used for applying such pressure, or a pump which is used to reduce the pressure on the permeate side may be a reversible pump which can be reversed to force liquids back against the permeate side. In one preferred embodiment, the system comprises an additional tank which contains liquid which is used to back-wash the membrane. A separate conduit for removing the back-wash which permeates through the membrane may be incorporated into the system. Such means can recycle the back-washed material to the back-wash tank or remove it from the system. In those embodiments where separate pumps are used for applying the vacuum to the permeate side of the membrane and for back-washing the membrane, a separate set of conduits and valving is required to provide for separate permeate removal and back-wash. The design and arrangement of such conduits, valves and pumps is well within the skill of the art. In such embodiments, valving is used to close off communication between permeate side of the membrane and the vacuum pump and further to open communication between the back-wash pump and the permeate side thereby allowing the back-wash fluid to be forced against the permeate side of the membrane and through the membrane to clean off the foulants through the feed side of the membrane unit.

In one embodiment of the invention, concentrate may be recirculated back to the feed inlet or within the vessel. In this embodiment, the feed fluid is continually circulated until a desired level of concentration is achieved. In the practice of the invention where a pump is continually recirculating material within the vessel, no separate recirculation pumps and pipes or conduits are required, although such separate pumps and conduits are not excluded from the system. The fact that the system can continually recirculate feed within the vessel itself is an inherent advantage of the claimed system. In another embodiment of the invention it may be desired to recirculate the permeate back to the feed inlet. This is desirable where the permeate is the desired product and the quality of the permeate as a result of one pass through the membrane is insufficient. Any means for performing the recirculation is suitable, preferably a series of conduits or pipes and pumps can be used to perform the recirculation. In one embodiment, a simple channel can be used to recirculate the material back to the feed side of the membrane.

Additionally, the vessel can be equipped with an oil skimmer. Where the feed contains a mixture of immiscible liquids, it may be desirable to incorporate a conventional skimmer into the apparatus so as to skim away one of the immiscible components before contacting the feed with the membrane units. In another embodiment, it may be desirable to incorporate into the feed inlet a heat exchanger. This would be useful in those embodiments where the temperature is critical to the separation. Conventional heat exchangers may be used.

Generally the apparatus or system can be operated in the following manner. Feed of a fluid mixture to be separated into a permeate stream and a concentrate or retentate stream is fed via the feed inlet to the vessel. The means for contacting the feed fluid with feed side of the membrane is preferably operated such that the feed fluid flows parallel to the surface of the membrane. In a preferred mode a propeller or recirculation pump is used to maintain the flow of feed along the surfaces of the membrane. At the same time a vacuum is applied to the permeate side so as to create a transmembrane pressure differential. Optionally the feed side of the membrane may be pressurized as described before so as to increase the transmembrane pressure differential. The material that permeates through the membrane is removed via the permeate flow system. If desired, either the concentrate or the permeate may be recycled. The system or apparatus can be operated as a one pass or recirculation system. In one pass system the feed material is passed by the membrane once and then removed from the vicinity of the membrane. In a recirculation mode either or both of the permeate and the retentate can be recycled as feed to the membrane. A recirculation mode is suitable when the desired product, either the permeate or the retentate does not reach the desired quality in one pass by the membrane. In a preferred mode the system of the invention is used to separate high molecular weight materials or large particle size materials from a liquid, for example bacteria or particulate material from surface water. Another example is the separation of enzymes or the products of fermentation broths from the broths. In preferred modes of operating the invention, the transmembrane pressure differential is as described hereinbefore. Preferably the flow rates of the permeate through the membrane is 10 $l/m^2 \cdot h$ or greater more preferably 30 $l/m^2 \cdot h$ or greater and most preferably 50 $l/m^2 \cdot h$ or greater. Preferably such flow rate is 3000 $l/m^2 \cdot h$ or less or more preferably 1000 $l/m^2 \cdot h$ or less and most preferably 500 $l/m^2 \cdot h$ or less. In one preferred embodiment in which high molecular weight materials and large particle size materials are removed from a liquid, it is preferred to circulate the material so that the feed liquid flows downward along the membrane units and the permeate collection means are at the side of the cassette membrane element, this has an advantage in that gravity may be used to help control or aid the flow of feed along the surface of the membranes.

The system of the invention is especially useful in situations where there is a low pressure drop along the external surfaces of the membrane unit. Pressure drop means herein the difference in the pressure on the external surface of the membrane from the point of initial contact with the feed fluid to the point along the membrane surface where the retentate is removed from contact with the external surface of the membrane. Preferably the pressure drop is 0.5 bar or less, more preferably 0.2 bar or less, and most preferably 0.15 bar or less. Preferably, the pressure drop approaches 0. More preferably the pressure drop is 0.05 or greater and even more preferably 0.10 or greater. In the embodiment where the feed fluid is flowed down from the top of the membrane cassette unit to the bottom the pressure drop can approach 0.

Preferred embodiments of the invention are illustrated by the reference to the figures. FIG. 1 is a side view of an apparatus according to the invention with a partial cut away of the tank containing the cassette membranes. FIG. 1 demonstrates a tank (11) containing 4 membrane cassettes (12) with the permeate outlets (13) on the side of each cassette (12). The cassettes (12) are supported on a rack (14). Further illustrated is a propeller recirculation pump (15) contained in a tube (16) on top of the tube is an inlet (17) (not shown) for introduction of feed into the tank (11). The tube (16) in which the propeller pump (15) is mounted is partially open at the bottom so that there is a connection between the open area in the tank (11) under the membrane cassettes (12). The propeller (15) functions to circulate feed such that it flows down through the membrane cassette (12). Further illustrated is a back-wash tank (18) which is adapted to hold fluid to be used to back-wash the membrane cassettes (12). A pump (19) is illustrated which is adapted to alternatively apply a vacuum on the permeate side of the membrane cassettes (12) or to pressurize back-wash fluid to back-wash the membrane cassettes (12). The pump (19) is connected with the permeate outlets (13) of the membrane cassettes (12), through permeation outlet connections (not shown in FIG. 1) which are connected to pipe (20) and flow to pump (19) through pipe (20) is controlled by valve (21). The permeate can be removed from the system via conduit (22) and a permeate outlet (not shown in FIG. 1). Valve (23) in conduit (22) is adapted for directing permeate into the back-wash tank via conduit (24), valve (25) connects the back-wash tank (18) with pump (19). Conduit (26) connects conduit (22) with conduit (20). Located in conduit (26) is valve (27). Conduit (26) and valve (27) facilitate the pumping of fluid by pump (19) back to conduit (20) thus facilitating the pumping of back-wash fluid to the permeate side of the membrane cassettes (12).

FIG. 2 is a top view of the apparatus depicted in FIG. 1. Illustrated is the primary tank (11), three of the membrane cassettes (12) and the top of the tube (16) containing the propeller pump (15) (not shown). FIG. 2 illustrates the feed inlet (17) the back-wash tank (18), the pump (19) and the conduit (20) for removing permeate from the membrane cassettes (12). A partial view of valve (21) adapted for controlling flow from the permeate conduits (20) to the pump (19) is shown. Conduit (22) adapted for carrying fluid away from pump (19), and valve (23) integrated into conduit (22) for controlling the flow of fluid from pump (19) via conduit (24) to back-wash tank (18) are illustrated. Valve (25) adapted for controlling flow from back-wash-tank (18) to pump (19) is illustrated. Conduit (26) and valve (27) are illustrated. Additionally illustrated in the top view are the four permeate connectors (28) on each side of the tank (18) adapted for connecting the permeate outlets (13) of the membrane cassettes (12) with permeate conduit (20). Valve (29) is connected to conduit (22) and adapted for redirecting permeate into tube (16) or tank (18) for recirculation of permeate as feed. Permeate outlet (30) for removal of permeate from the system is illustrated. Flow of permeate to permeate outlet (30) is controlled by valve (31).

Operation of the apparatus is described by reference to FIGS. 1 and 2. Feed fluid is introduced via feed inlet (17) through the tube (16) into the tank (11). The system can be started up in the following way. Valves (21), (23), (27), (29), and (31) are closed. Valve (25) is opened and pump (19) is started. Valve (23) is open to recirculate any liquid back to the back-wash tank (18) and valve (21) is open to allow the pump (19) to draw from the permeate from the membrane cassette (12). Valve (25) is closed until a vacuum of 0.1 to 0.2 bar is obtained and the air has been taken out of the membrane cassettes (12). When all or most of the air has been removed from the membrane cassettes (12) valve (23) is closed and valve (31) is opened and the module is in operation mode. Thereafter recirculation pump (15) is started up so that the liquid within the tank (11) circulates in a fashion such that it enters the membrane cassettes (12) from the top and flows down along the membrane surfaces to the bottom. Fluid that permeates through the membranes is taken out of the membranes cassettes (12) through permeate outlets (13) and transferred to conduit (20) by the permeate outlet connectors (28). The permeate flows through conduit (20) and valve (21) to pump (19). Conduit (22) carries the permeate away from pump (19). In conduit (22) the permeate may either be recycled through conduit (24) and valve (23) into the back-wash tank (18), recirculated to the feed tank (11) through valve (29) or removed from the system through outlet (30). Concentrate may be removed from the system via concentrate outlet (32) (not shown).

A back-wash of the membrane cassettes (12) can be performed by opening valve (25), closing valve (31) and opening valve (26). Fluid from the back-wash tank (18) is pumped via pump (19) through conduit (22) and (26) into conduit (20) back into the membrane cassettes (12) through permeate connectors (28) and permeate outlets (13). Once back-wash has been completed then the module may be returned to the operation mode as described previously.

FIGS. 3 and 4 show a rack of 25 double membrane cassettes. FIG. 3 illustrates the perspective view of a 25 double cassettes rack, in particular a rack (33) containing 25 double membrane cassettes (34) arranged in the rack (33) so that the top of the membrane cassettes (34) are open to allow flow of fluid down through the membrane cassettes (34) along the surface of the membranes. Further illustrated is a permeate manifold channel (35) on each side of the double membrane cassettes (34). Connected to the permeate manifold (35) is a permeate outlet (36). At one end of the rack (33) are illustrated protrusions (37) for holding the membrane cassettes (34) in the rack (33).

FIG. 4 is a cut away cross-section of the end of the rack (33), which membrane contains a double cassette (34) having two filtration units (38) wherein the membrane cassette (34) is supported by protrusions (37). Further illustrated is the connection of the permeate manifold (35) through a permeate connector (39) to the permeate outlets (40) of the double membrane cassette (34).

FIGS. 5, 6 and 7 disclose a large open separation system within the scope of the invention. FIG. 5 is the top view of an open channel rack membrane cassette system, and illustrates two adjacent rows of 10 racks (33), each rack containing 25 double membrane cassettes (34). A feed channel (41) between the two adjacent rows is illustrated. In the middle of the feed channel (41) is a recirculation pump (42) designed for circulation of the fluid to the top of the membrane cassettes (34) so that the fluid will flow downward through the membrane cassettes (34) adjacent to the membrane surfaces. Also shown is a series of permeate outlets (36) connected to a permeate manifold (43) for removing permeate from the vicinity of the membrane cassettes (34). Attached to the permeate manifold is a pumping station (44) adapted to applying a vacuum to the permeate side of the membranes in the membrane cassettes (34). The permeate pumping station (44) can be replaced with a deep well that the permeate flows down. The permeate can be removed from the bottom of the well. The removal of the permeate from the bottom of the well aids in the creation and maintenance of a vacuum on the permeate side of the membrane units. Also illustrated is a feed inlet channel (45) for adding feed liquid to the system. The outline of a concrete vessel (46) is illustrated which is adapted to contact the feed fluid with the racks (33) of double membrane cassettes (34).

FIG. 6 is a side cut away view of the open channel separation system described in FIG. 5. The system shows the outline of a concrete vessel (46) which has a series of racks (33) connected by a permeate outlet (36) which is further connected to a permeate manifold (43). In the center between the racks is a feed channel (41) containing a recirculation pump (42) (not shown). The vessel (46) is designed to create a concentrate channel (47). Also shown are concrete supports (48) for supporting the racks (33) in the concrete tank (46). The water level is indicated by line (49).

FIG. 7 demonstrates a partial cut away from the side of the same system, this shows a series of three adjacent racks (33) illustrating three double membrane cassettes (34) which are supported by protrusions (37) of the racks (33). Also illustrated are the concrete supports (48) designed to hold the racks in the concrete tank (46). Further illustrated are the permeate outlets (36) and the permeate manifolds (35 and 43).

FIGS. 8, 9, 10 and 11 demonstrate various stages of assembly of a hollow fibre membrane cassette. FIG. 8 illustrates the end view of a single layer (51) of hollow fibres (52) potted in a curable binder (53). FIG. 9 shows the same layer (51) from the top having a series of hollow fibres (52) with each end potted in a curable resin (53). Further illustrated is a reinforcement strip (54) of curable resin which is parallel to the hollow fibres (52), such reinforcement strips (54) can be placed at set intervals along the hollow fibre layer (51) according to the need for reinforcement. Also demonstrated is a reinforcement layer (55) running perpendicular to the hollow fibres (52).

FIG. 10 demonstrates a series of hollow fibre layers (51) built up into a stack, each layer (51) has a series of hollow fibre membranes (52) in curable binder (53) at the end of the hollow fibres (52) to hold them in place. Between the curable binder (53) of each layer (51) is found curable binder layer (56) which binds the layers (51) of hollow fibres (52) together. FIG. 11 shows a side view of the same assembly as demonstrated in FIG. 10. The figure demonstrates a series of hollow fibre layers (51) comprising hollow fibres (52) bonded at each end in a curable binder (53). Each of the layers (51) are bound together at the ends by a curable binder layer (56) which binds together the curable binder (53) strips which hold the hollow fibres (52) in place. Also illustrated by this figure are the open areas (57) between the layers of hollow fibres (52) which are adapted for allowing a flow of fluid between the hollow fibres (52) thus creating the necessary contact of the feed fluid with the membranes to allow for permeation of a portion of the feed fluid through the hollow fibre membranes (52).

The filtration unit illustrated in FIG. 12 comprises a membrane stack (60) consisting of membranes (61 and 62 e.g.) in the order of 100 or more, arranged in pairs, a spacing element in the form of a net or web (63) being provided between the membranes of each pair (61 and 62) and serving to keep the membranes (61 and 62) at a distance from one another such that the permeate can flow along the membranes (61 and 62) towards a permeate collecting chamber to be described below. The pairs of membranes (61 and 62) are spaced from one another by means of spacing elements in the form of nets or webs (64) that are coarser than the nets or webs (63). At the ends of the stack of membranes, end plates (65) are provided which at the underside of the stack (60) of membranes are interconnected by a bottom plate (66).

At the side faces of the stack (60) supporting ribs (67) are provided, the ends of which are fastened in slots at the edges of the end plates (65).

The upper side of the filtration unit is constituted by a top plate (69), which together with an end piece (71) form a permeate collection chamber (72) on top of the stack (60). In this chamber (72) transverse supporting ribs (73) are provided in which accurate incisions (74) are made at their top to permit permeate collected in the chamber (72) to flow towards a permeate outlet (75).

The filtration unit illustrated in FIG. 12 may advantageously be produced as follows: One end of each supporting rib (67) is inserted into the corresponding marginal slot (68) of one of the end plates (65) and is welded therein. Then the required number of pairs (61 and 62) of membranes with interposed spacing elements (63) are produced by placing a net or web (63) between the two membranes (61 and 62) of each pair (61 and 62) and closing each pair along three edges by means of an adhesive or by heat sealing. The pairs (61 and 62) of membranes thus produced are then stacked upon each other on the said end wall (65) with interposition of spacing elements (64) between the pairs. The other end plate (65) is now placed against the stack and connected with the supporting ribs (67) by introducing the free ends of the ribs (67) into the marginal slots (68) of the plate and welding them therein. A moulding material or binder is now introduced into the interspaces between the pairs of membranes (61 and 62) from the top and bottom of the unit thus provided by placing the unit in an inverted and upright position, respectively, in a moulding box which is partly filled with the moulding material, the moulding material also penetrating into the interstices of the spacing elements (64). The moulding material is introduced up to a distance, e.g. 40 mm, from the top and bottom surface of the unit, respectively. Upon curing of the moulding material the moulding box is removed, and when both the top and the bottom have been thus treated, the bottom plate (66) is welded in position between the two end plates (65).

The top of the unit thus produced is now subjected to a surface cutting or machining operation to remove material up to a depth which is substantially smaller than the above mentioned distance, e.g. 3 mm. Thereby a free passage is established to the flow passages between the two membranes of each pair (61 and 62) without establishing a communication with the flow passages formed by the spacing elements (64) between successive pairs (61 and 62) of membranes.

Finally, the permeate collecting chamber is formed by welding the top plate (69) with supporting ribs (73) and wall portions (70) and (71) to the unit.

FIG. 13 is an expanded view of the connection of the permeate manifold of the rack support to the membrane cassette from FIG. 4. FIG. 13 shows the connection of the permeate collection chamber (72) through the permeate outlet (40) and permeate connection (39) to the permeate manifold (35). Also illustrated are the ribs (73) and the incisions (74) of the permeate collection chamber (72). A seal (76) about the connection of the permeate outlet (40) and permeate connection (39) is shown. Thus permeate collected in the permeate collection chamber (72) flows through the permeate outlet (40) and the permeate connection (39) to the permeate manifold (35) which carries the permeate to a point at which it is removed from the system.

The following examples are included for illustrative purposes only. Unless otherwise stated all parts and percentages are by weight.

EXAMPLES

An apparatus as illustrated by FIGS. 1 and 2 is used for the following examples. The apparatus contains four membrane cassettes with 100 leafs (pairs) of flat sheet membranes having a size of 435 mm×435 mm. The spacer in each leaf is 0.4 mm and the spacer between leafs is 0.8 mm. The membranes are polyvinylidene fluoride ultrafiltration membranes having a molecular weight cut-off of 100,000 and a flux for pure top water of 500 to 600 liter/m$^2$/h/bar. Both the separation tank and backflush tanks have a 400 liter capacity. The system is run with recirculation of permeate to the feed tank.

Example 1

The water flux of the system is examined at two permeate pressure levels at 15° C. The results are compiled below in Table 1.

TABLE 1

| Permeate pressure Pp (bar) | Permeate flow Vp m$^3$/h | Flux l/m$^2$/h | Flux per bar l/m$^2$/h/bar |
| --- | --- | --- | --- |
| −0.8 | 31.5 | 263 | 328 |
| −0.4 | 18.1 | 150.8 | 377 |

Example 2

A test of a latex/color mix having a concentration of 2 l in 400 l water is run. The results are compiled below in Table 2.

TABLE 2

| Time plan start up hours | Permeate pressure Pp (bar) | Permeate flow Vp (m3/h) | Flux l/m$^2$/h | Flux per bar l/m$^2$/h/bar |
| --- | --- | --- | --- | --- |
| 0 | −0.17 | 7 | 58 | 341 |
| 0.5 | −0.25 | 7 | 58 | 233 |

A back wash after 30 minutes restores the system to the beginning performance.

Example 3

The membrane system is flushed with tap water after Example 2. 1 kilogram of yeast is added to 400 liters of water in the feed tank to form a yeast solution of 0.25 percent. The membrane system is started up and run for a lengthy period. The operation conditions of the membrane are examined periodically and reported below in Table 3.

TABLE 3

| Time | Comments | Permeate Pressure (bar) | Permeate flow (m3/h) | Flux (l/m2/h) | Temp. (°C.) |
| --- | --- | --- | --- | --- | --- |
| Startup (0) | | −0.18 | 5.8 | 48.3 | 18 |
| 3 hours | | −0.20 | 5.8 | 48.3 | 30.1 |
| | System backwashed 18m$^3$/h; 0.4 bar[1] | | | | |
| | Conditions after backwash | −0.12 | 5.8 | 48.3 | 30.1 |
| 30 minutes | Fouling develops | −0.17 | 6.0 | 50 | 32.5 |
| | Conditions changed 20 kg of yeast added, total 40 kg, (10% yeast in water) | −0.32 | 11 | 91.7 | 34 |
| 0 | Start up parameters | −0.45 | 5.5 | 45.9 | 24.5 |
| 40 minutes | | −0.45 | 5.5 | 45.8 | 31.8 |
| | 40 kg of yeast added (20% yeast in water) | | | | |
| 0 | start up parameter | −0.5 | 4.5 | 37.5 | 23.7 |
| | After 10 minutes backwashed, 18m$^3$/h 0.4 bar[1] | | | | |
| | after backwash | −0.15 | 4.0 | — | 24.1 |
| | Plant left running over night with propeller only running | | | | |
| 0 | Restarted next morning | −0.3 | 5.0 | 41.7 | 25.1 |
| 30 minutes | | −0.3 | 5.0 | 41.7 | 25.9 |
| 36 minutes | | −0.46 | 12 | 100 | 35.7 |
| | Backwash 18 m$^3$/h permpressure 0.35 bar[1] | | | | |
| 0 | Parameters after backwash | −0.31 | 12 | 100 | 35.7 |
| 0 | The next day the plant is restarted | −0.43 | 12 | 100 | 25.5 |
| 1 hour | Backwash 18m$^3$/hr permpressure 0.4 bar[1] | −0.52 | 12 | 100 | 28.3 |
| 0 | Parameters after backwash | −0.40 | 12 | 100 | 27.5 |
| 1 hour | Backwash, | −0.35 | 12 | 100 | 30 |

TABLE 3-continued

| Time | Comments | Permeate Pressure (bar) | Permeate flow (m3/h) | Flux (1/m2/h) | Temp. (°C.) |
|------|----------|-------------------------|----------------------|---------------|-------------|
| 0 | 18 m³/h, 0.4 bar[1] 9 kg yeast added, concentration of yeast 25 percent Conditions after backwash | −0.5 | 10.5 | 87.5 | 29 |
| 36 minutes | | −0.59 | 9.5 | 79.2 | |

1. Backwash is performed with a volume of 100 liters (25 l/cassette or .8333 liter/m² membrane).

I claim:

1. A membrane fluid separation apparatus comprising
   a) one or more membrane cassettes, said cassettes comprising a plurality of membranes with a feed side an a permeate side, and a permeate collection chamber, the permeate being collected in said permeate collection chamber;
   b. means for contacting the feed fluid with the feed side of the membranes;
   c. means for removing the permeate from the permeate collection chamber;
   d. a frame supporting said membranes at their peripheral edges and permitting feed flow access to the feed side of the separation membranes such that said feed side of the membranes is open to ambient pressure, said membranes being provided in the form of a plurality of membrane layers, each layers being sealed at two or more of its peripheral edges to one or more adjacent membrane layers, such that the membranes define a feed side and a permeate side, wherein the permeate side of each of said membrane opens to at least one permeate collection chamber common to another membrane permeate side, and wherein the membranes are sealed such the feed side and permeate side of the membranes do not communicate other than through the membranes.

2. A membrane fluid separation apparatus according to claim 1, which further comprises a vessel for holding said one or more membrane cassettes.

3. Apparatus according to claim 2 wherein the membranes are in the form of rectangular sheets arranged in a stack wherein the edges of the sheets are aligned to form four planes perpendicular to the surfaces of the membranes, wherein the stack of membranes is bound together by a cured binder along at least two of the four planes.

4. Apparatus according to claim 1, wherein the membranes are in the form of rectangular sheets arranged in a stack wherein the edges of the sheets are aligned to form four planes perpendicular to the surfaces of the membranes, wherein the stack of membranes is bound together by a cured binder along at least two of the four planes and the stack of membrane layers is bound by the said cured binder along two opposite edges, and wherein adjacent pairs of edges of the membranes are sealed to each other along their other opposite edges, thereby creating flow passages between the membranes of each adjacent membrane pair and between each adjacent membrane pair, to define the said feed side and permeate side respectively.

5. Apparatus according to claim 4 wherein a spacer is located between each sheet of a membrane pair to promote the flow of permeate between the membranes.

6. Apparatus according to claim 1 wherein the membranes are in the form of rectangular sheets arranged in a stack wherein the edges of the sheets are aligned to form four planes perpendicular to the surfaces of the membranes, wherein the stack of membranes is bound together by a cured binder along at least two of the four planes.

7. Apparatus according to claims 1, 2, 3, 4, 5, or 6 wherein the membranes are adapted to separate components having a molecular weight of from 10,000 to a particle size of 5 microns from a liquid stream.

8. Apparatus according to claims 1, 2, 3, 4, 5, or 6 wherein the reduced pressure on the permeate side of the membrane is created by applying a vacuum to the permeate side of the membrane.

9. Apparatus according to claims 1, 2, 3, 4, 5, or 6 including a propeller for contacting the feed fluid with the feed side of the membranes.

10. A method of separating a feed fluid stream into two components which comprises
    A. contacting the feed stream with the feed side of the membranes of apparatus according to claims 1, 2, 3, 4, 5, or 6;
    B. reducing the pressure on the permeate surfaces of the membrane units to 10,000 to 80,000 Pa such that a portion of the feed fluid permeates through the membrane;
    C. removing the portion of the feed fluid which permeates through the membrane from the vicinity of the internal surfaces of the membrane; and
    D. removing the portion of the feed fluid which does not permeate through the membranes from the vicinity of the external surfaces of the membrane.

11. Membrane fluid separation apparatus comprising
    A. a plurality of membrane cassettes said cassettes comprising
       i. one or more filtration units comprising a plurality of membrane units which said membranes comprising structures capable of performing a fluid separation at a relatively low transmembrane pressure, wherein the membrane structure has an internal surface and an external surface which do not communicate, the internal surfaces of the plurality of membrane units are open in one or more common areas to facilitate flow of permeate out of the membrane units, such common open areas are sealed such that fluid flowing from the vicinity of internal surfaces of the membrane units can not communicate with the external surfaces of the membrane units;
       ii. a casing comprising a frame arranged about the one or more filtration units such that there are two fluid flow systems which do not communicate, the first fluid flow system is in contact with the external surfaces of the membrane units and is adapted for contacting feed fluid with the membrane units and the second fluid flow system is in contact with the internal surfaces of the membrane units and the casing further comprises a permeate collection chamber in contact with the internal surfaces of the membrane units in the vicinity of the common open areas and a flow passage which is adapted for removing permeate from the vicinity of the internal surfaces of the membrane units;

B. a means for contacting the feed fluid with the external surfaces of the membrane units;

C. a means for removing the permeate from the permeate flow passages of the plurality of membrane cassettes;

D. one or more means for creating a transmembrane pressure differential by reducing the pressure on the internal surfaces of the membrane units to subatmospheric; and E. a means of removing feed fluid which does not permeate across the membrane from the vicinity of the external surfaces of the membrane.

* * * * *